United States Patent [19]
Gibson

[11] 3,710,129
[45] Jan. 9, 1973

[54] METHODS OF AND APPARATUS FOR DETECTING MINUTE HOLES IN OBJECTS

[76] Inventor: Harry T. Gibson, 9511 Warfield Road, Gaithersburg, Md. 20760

[22] Filed: Feb. 16, 1971

[21] Appl. No.: 115,281

[52] U.S. Cl.............250/219 DF, 250/238, 356/36, 356/237
[51] Int. Cl...........................G01n 21/32, H01j 7/24
[58] Field of Search ...250/219 DF, 238; 356/237, 36

[56] References Cited

UNITED STATES PATENTS

| | | | |
|---|---|---|---|
| 3,564,269 | 2/1971 | Lynch | 356/237 X |
| 1,965,819 | 7/1934 | Allen | 356/237 |
| 3,327,126 | 6/1967 | Shannon et al. | 250/238 X |

Primary Examiner—James W. Lawrence
Assistant Examiner—T. N. Grigsby
Attorney—Low & Matthews

[57] ABSTRACT

Methods of and apparatus for detecting minute holes in objects by using photoelectric cell means, such as a photomultiplier. Each object to be tested is placed or moved between a light source and the photoelectric cell means and suitably sealed from extraneous light so that the only light that can activate the photoelectric cell means comes through one or more holes or cracks in the object. The method is practiced by flexing the article during the inspection thereof by any one of a number of means in order to be certain that any hole is not inadvertently closed by virtue of its disposition and/or size in the object being tested. A flexible light seal means is disclosed which permits ease of inspecting discrete articles. In order to increase the sensitivity of the photoelectric cell means, there is disclosed means for lowering the thermal noise thereof whereby it may be operated at higher per stage voltages without becoming unstable.

14 Claims, 13 Drawing Figures

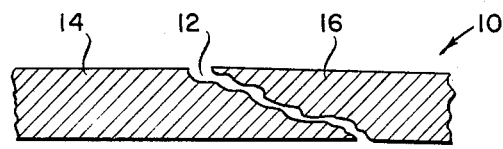
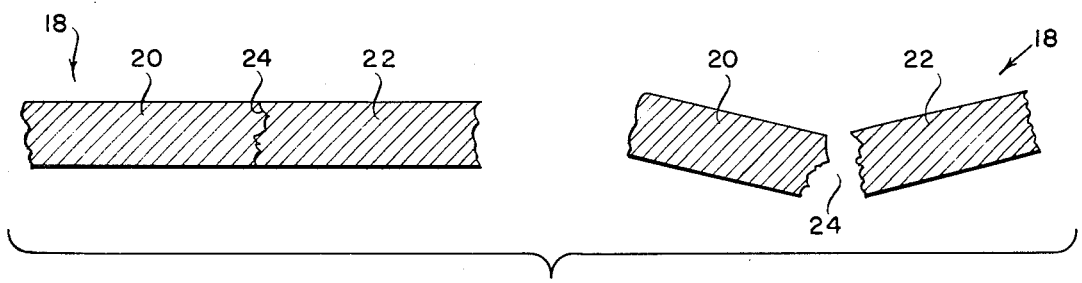
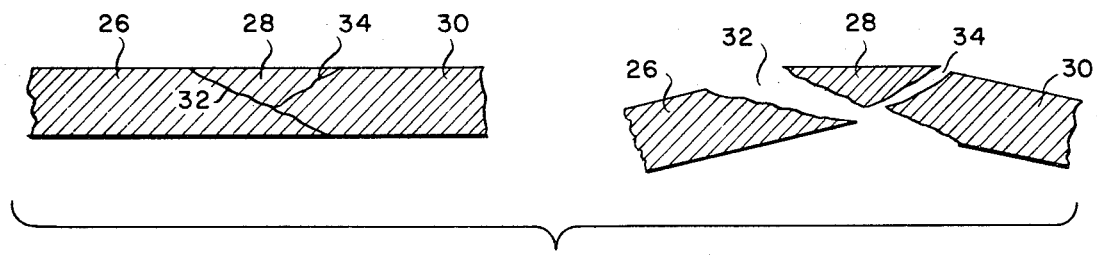
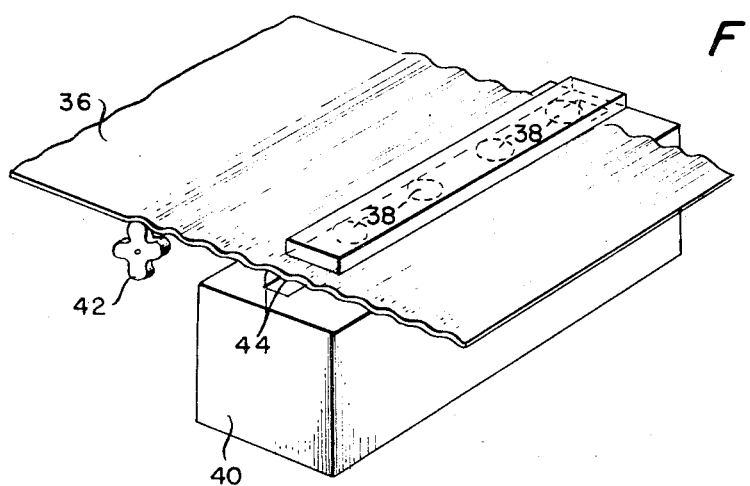
INVENTOR
Harry T. Gibson

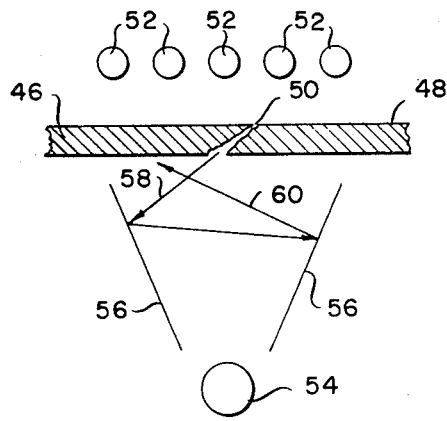
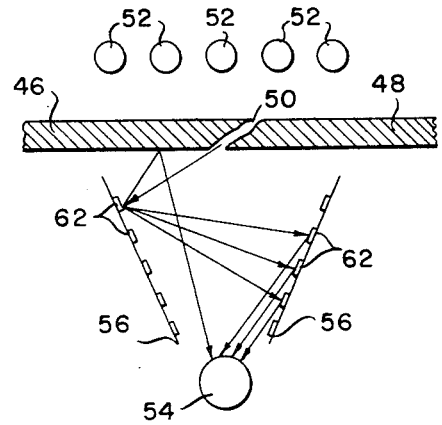
Fig.5    Fig.6
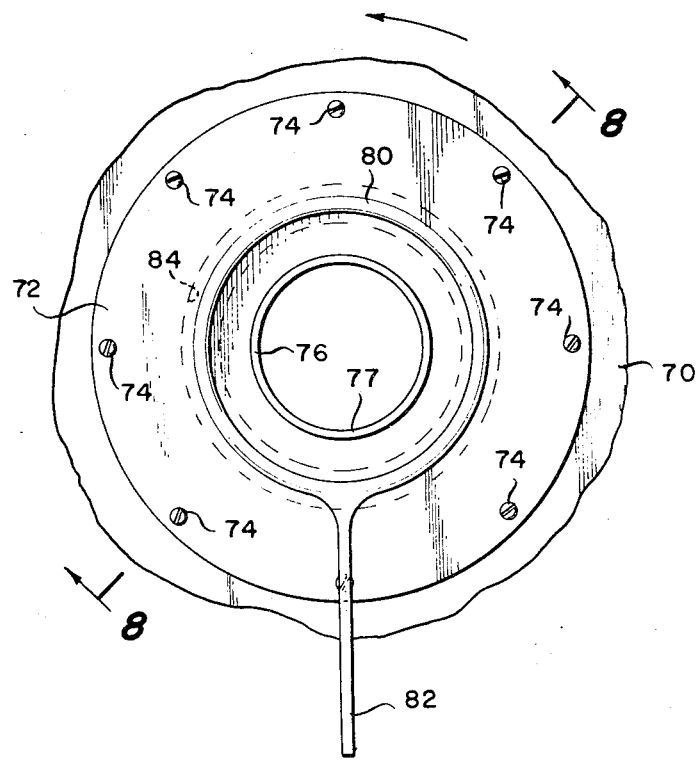
Fig.7
INVENTOR
Harry T. Gibson

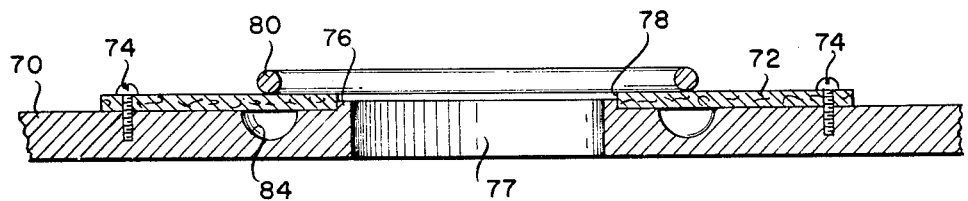
Fig. 8
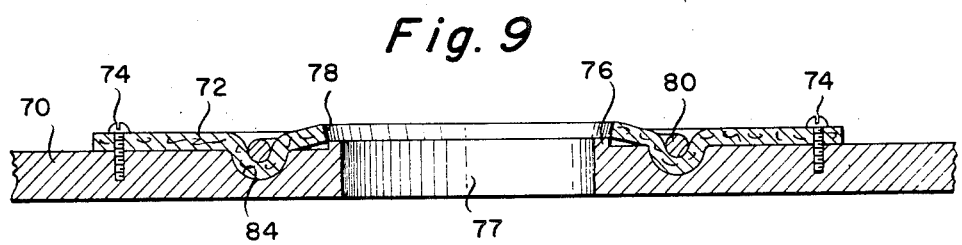
Fig. 9
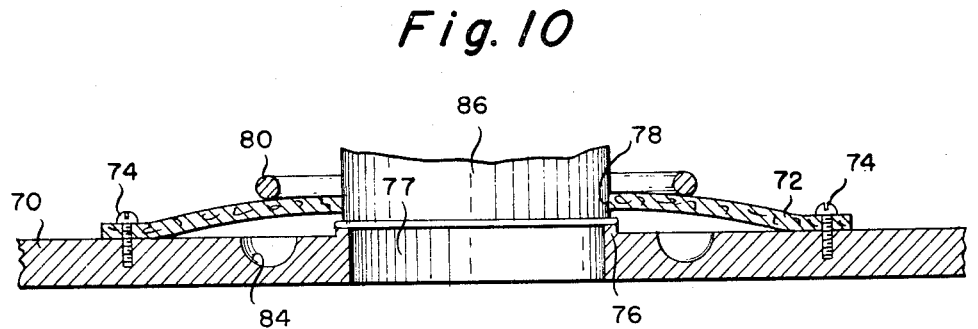
Fig. 10
Fig. 11
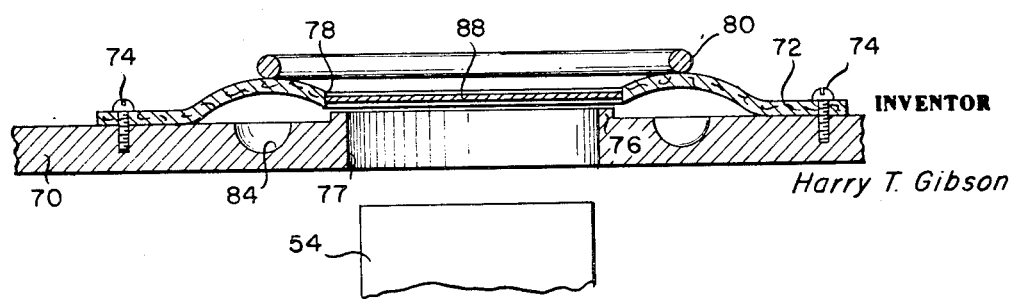
INVENTOR
Harry T. Gibson

METHODS OF AND APPARATUS FOR DETECTING MINUTE HOLES IN OBJECTS

This invention relates to methods of and apparatus for detecting minute holes in objects and more particularly to such methods and apparatus which employ photoelectric inspection means.

As defined herein, the work "hole" is intended to mean any aperture, crack or other imperfection in an object through which light may pass.

The word "object" is defined herein to designate both articles which are discrete in size and materials which may have an indefinite length.

Heretofore, it has been known to use devices which are able to detect imperfections in objects by photoelectric cell means where the hole or imperfection in the object is sufficiently large to permit light to pass therethrough directly to the sensor means. Difficulty exists, however, when the hole, crack or other imperfection in the object is extremely small or located at such an angle that it is not possible to have the light pass directly to the sensor means. It has been found that stimulating a flexure in the object being inspected opens up cracks, realigns laminated material and changes the angle of the material's surface with respect to the sensor so that light coming through shallow angle holes can reach the sensor.

Another feature of the present invention comprises the use of reflectors and stimulated emission from phosphors which help to ensure detection of the fault. In a preferred from of the invention, the phosphors are located on the reflectors.

A light seal is employed which surrounds an aperture in an inspection table. Thus it is possible to maintain light-tight integrity during the inspection of discrete objects such as, but not limited to, containers, tubes, disks, and sheets, where the boundary condition is sealed. A light seal is established which prevents light from impinging upon the sensor by getting past the boundary of the object to the sensor. Ideally, the light leakage is zero whereby the sensitivity of the inspection device is the same as the maximum sensitivity of the sensor.

A method is also disclosed for lowering the thermal noise of the sensor element itself, such as a photomultiplier tube. The tube itself is placed within a thermally insulated recess and the surrounding air is cooled within the recess preferably by expansion of a compressed fluid, such as air, within the recess. This method includes suppressing a corona discharge from electrodes within the photoelectric cell means itself such as by surrounding the photoelectric cell means with a metallic screen which is maintained at the cathode potential of the photoelectric cell means. In a preferred embodiment, a copper screen coated with rhodium is used as the corona discharge suppressor.

The inherent advantages and improvements of the present invention will become more readily apparent upon considering the following detailed description of the invention and by reference to the drawings in which:

FIG. 1 is a fragmentary elevational view of an object having a shallow angle hole therethrough;

FIG. 2 is a fragmentary elevational view of another object having a hole therethrough showing two positions;

FIG. 3 is a fragmentary view taken in vertical cross section of a laminated material shown in two positions;

FIG. 4 is a perspective view schematically indicating means for establishing a standing wave in an object to be tested;

FIG. 5 is an elevational view, schematic in nature, illustrating an unsatisfactory light reflection;

FIG. 6 is an elevational view, schematic in nature, and similar to FIG. 5, showing additional light-enhancing means;

FIG. 7 is a fragmentary plan view of an object inspection station;

FIG. 8 is an elevational view taken in vertical cross section along line 8—8 of FIG. 7;

FIG. 9 is an elevational view similar to FIG. 8 showing a different position of the light seal means;

FIG. 10 is an elevational view similar to FIG. 8 showing a container in position at the inspection station;

FIG. 11 is an elevational view similar to FIG. 8 showing a disk in position at the inspection station;

Figure 12:
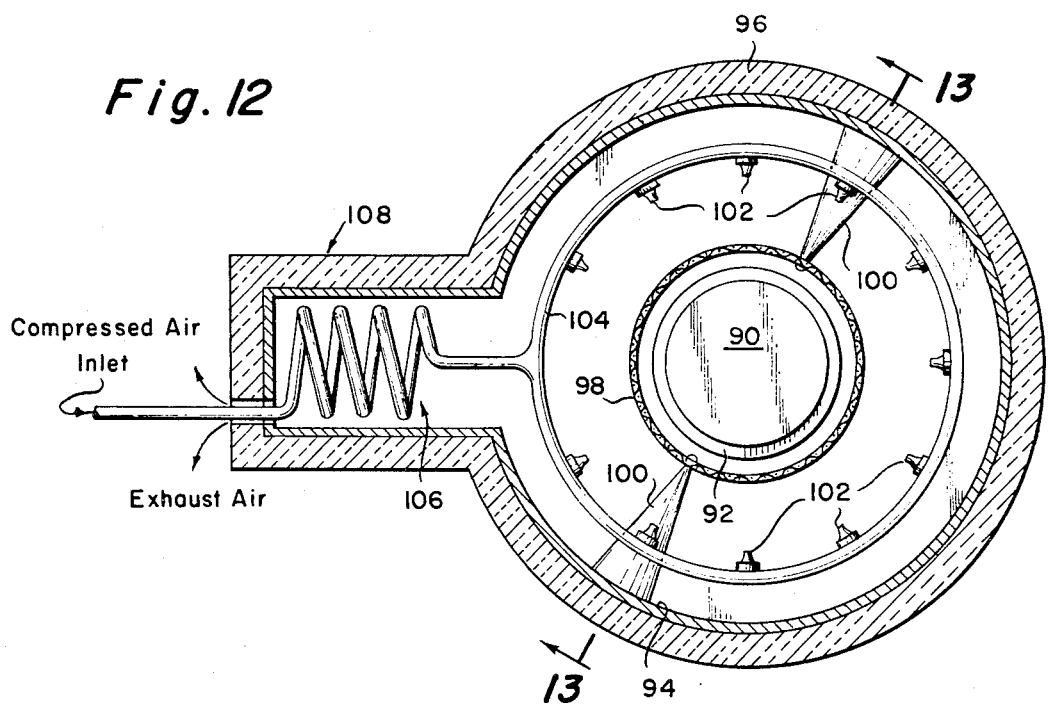
FIG. 12 is a top plan view of a photoelectric cell means used in connection with the subject invention; and, FIG. 13 is an elevational view, partially in vertical cross section, and is viewed along line 13—13 of FIG. 12.

Referring now to FIG. 1, there is illustrated an object indicated generally at 10 having a hole or crack 12 at a rather severe angle with respect to the top and bottom of its designated parts 14 and 16. As will be readily appreciated, if one were to use a photoelectric cell means in order to attempt to detect the hole or crack 12 in article 10, the light would have to follow a tortuous path in order to get from the light source to the sensor means and may possibly not reach the sensor means.

Another difficult hole or crack detection problem is illustrated in FIG. 2 wherein an object is indicated generally at 18 and consists of parts 20 and 22 on opposite sides of a hole or crack 24. In one position the hole or crack 24 is substantially completely closed whereas in the other position the object 24 has been flexed which permits the hole or crack 24 to open up and thereby allow the passage of light therethrough.

FIG. 3 illustrates lamination of parts such as are designated at 26, 28 and 30 with the potential for holes or cracks at 32 and 34. In a second position of this figure the parts are subjected to flexure in order to open up the laminates and allow passage of light therethrough. In some instances, rotation or other movement of the object with respect to the sensor means will be sufficient to permit detection of the hole.

In accordance with the present invention, objects to be inspected are flexed by any number of means, largely depending upon the object under inspection.

FIG. 4 illustrates mechanically inducing flexure into an object 36 consisting of strip material which is being fed in the direction of the arrow between a source of light 38 and a box containing light sensors 40. A lobed roller 42 comprises a flexure inducing means which induces longitudinal standing waves in the object 36 so as to open up any incipient or actual cracks or holes in the material. The inducing means 42 may also be electrical, magnetic or pneumatic in nature, or combinations thereof, depending in large part upon the material being tested. Transverse flexures may also be stimulated by acoustical means. For objects such as containers and disks, flexures may readily be achieved by subjecting the container to pulsations of internal pressure or vacuum. Automatic vibration producing means may also be used.

In causing flexure of the object, it is desired to achieve a displacement between contiguous material so as to create transient realignment of material surrounding an imperfection in order to permit light to pass through the imperfection and activate an associated light sensor. The subject flexure must occur during the period of inspection. The probability exists that the subject flexure will close certain imperfections to the passage of light. Therefore, it is preferable that inspection be performed prior to, during and subsequent to flexure. Also, in most instances, means are required to move the object into and out of the zone between the source of light and the light sensor means.

Variable frequencies and amplitudes may be employed. In some instances, flexure may be helpful in dislodging a primary inclusion in an object which temporarily obscures a hole in the object.

FIG. 5 illustrates another object having parts 46 and 48 with a hole or imperfection 50 placed between a suitable light source 52 and a light sensor 54. Reflectors 56 positioned between the object being inspected and the light sensor normally help to direct the light passing through a hole or imperfection 50 toward sensor 54. However, in some instances, a light ray 58 may strike one reflector element 56 and be redirected against another reflector element 56 and then be redirected as at 60 away from the light sensor means 54.

Accordingly, in order to minimize the failure to detect a hole 50 by such a condition, there is disclosed in FIG. 6 the use of phosphor stripes 62 on reflectors 56 and achievement of a stimulated light emission from the phosphors 62 which are received at the sensor 54. Thus it is seen that by the use of stimulated emission from phosphors, it is possible to cause detection of a shallow angle hole that would otherwise go undetected. In this connection, phosphors represent a material which emits light when stimulated by radiation. In the example shown, the phosphor is stimulated to radiation by incident radiation.

Reference to FIGS. 7–11 illustrate a preferred light seal arrangement. There is illustrated a work table or transport table 70 which is used to carry the object being tested and move it, as indicated by the arrow into and out of a zone between a light source and a sensor element. The light sensors 52 and 54 are illustrated schematically in FIG. 11 and may be the type illustrated previously in connection with FIGS. 5 and 6. A light seal material 72 which is flexible in nature is suitably attached to table 70 by means of anchoring or attaching means 74. The table itself is provided with a lip or embossment 76 which immediately surrounds an aperture 77 therein. The flexible light seal material 72 has an inner edge 78 which in FIG. 8 is shown in contact with the lip or embossment 76 and which normally engages the boundary of the object being tested. Any suitable means, not shown, may be used to rotate or index table 70.

In order to receive an object in the inspection position, means such as a seal depressing ring 80, which is attached to a handle or actuating means 82, FIG. 7, is used to depress the light seal material 72 into a groove 84 which is concentric with aperture 77. Thus the light seal means is withdrawn away from aperture 77 in order to receive an object such as container 86 in FIG. 10 or a disk or can end 88 in FIG. 11. When the handle or actuating means is released, the edge 78 of seal material 72 engages the boundary of the object 86 or 88 being tested and establishes a light seal therewith whereby the only light from light sources 52 to light sensor 54 must pass through a hole or crack or other imperfection in the object 86 or 88. After the light seal is established, the object being tested is flexed by any suitable means. That is, the object may be flexed electrically, mechanically, magnetically, acoustically or by pressure or vacuum. For example, one convenient manner of flexing the object 86 or 88 is to utilize pulsations in a pressure or vacuum line which communicates with the object and which is used to facilitate holding the object in place.

The seal 72 is preferably a flat toroid of rubber or rubber-like material or polyurethane or any other light impervious material capable of rapidly conforming to the boundary imperfections of an object to be inspected so that no opening is left between the seal and the object through which light can pass to the sensor. The flexible toroid is fastened around its largest diameter to the transport table concentric to the hole in the table. The depth and width of groove 84 is approximately equal to four times the thickness of the flexible toroid. Located concentric with the groove and directly above groove 84 is a ring 80 whose diameter is equal to the means diameter of the groove. The flexible toroid is located between the ring and the groove. The ring is mechanically actuated so that it can be lowered pressing the flexible toroid into groove 84. This action increases the inner diameter of the toroid permitting the object to be placed over the hole in the transport table. When the object is in position the ring is removed from the groove allowing the inner diameter of the flexible toroid to compress against the boundary of the object thereby closing the light path between the boundaries of the object and the transport table.

Figure 13:
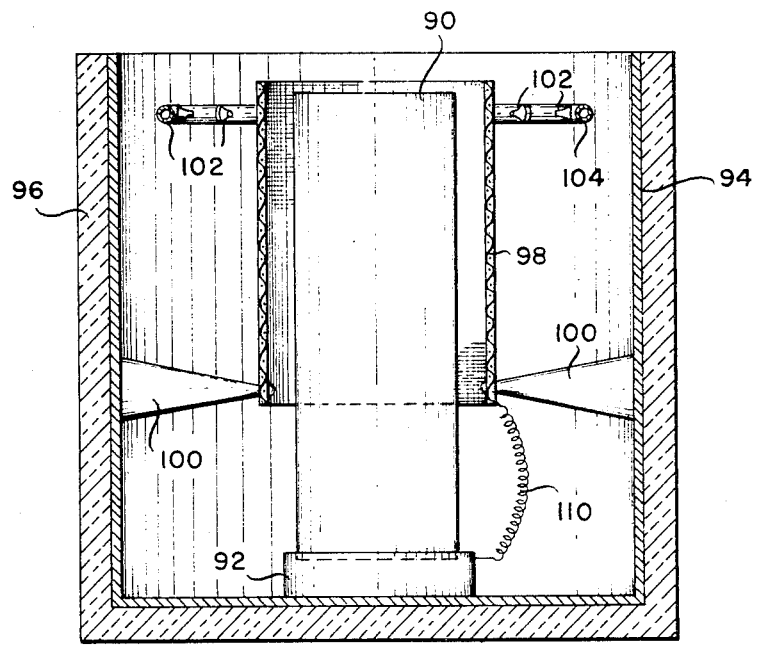

Referring now to FIGS. 12 and 13, there is illustrated a method of lowering the thermal noise of a photoelectric cell means, such as photomultiplier tube 90 having base 92. The photomultiplier 90 is positioned within a recess provided by a metal enclosure 94 having side walls and a bottom wall and which is thermally insulated by insulation 96. A charge catching screen 98 is supported by a series of insulators 100 from the walls of the metallic enclosure 94. A series of nozzles 102 are supplied with compressed air through a manifold or tube 104 and is preferably cooled in the region indicated generally at 106 of a lead in chamber indicated generally at 108. A wire 110 connects screen 98 to the cathode potential of the photomultiplier tube.

Although it would be possible to lower the thermal noise of the photomultiplier tube 90 by means of liquid gases, such an application to an industrial installation would not be economically feasible. Similarly, a mechanical refrigeration of the photomultiplier tube would also be too expensive. However, it is economically feasible in industrial plants to use the disclosed static, inexpensive and trouble-free equipment illustrated in FIGS. 12 and 13.

An energy exchange occurs in the expansion of compressed air through nozzles 102 in order to cool the cathode of photomultiplier tube 90. The nozzles are of plastic material to lower the rate of heat transfer from the nozzle and its mounting to the expanding air. To keep the air from transferring its charge to the glass of the photomultiplier envelope, the air is blown through screen 98 which preferably is a rhodium-plated copper screen and which is maintained at cathode potential. Such an arrangement assures that no charge will be transferred from the air to the glass envelope of photomultiplier tube 90. If the envelope does pick up a charge a corona discharge from the electrodes of the tube to the glass is the normal result. Because of the light and the electrical noise associated with corona discharge such an event is accompanied by catastrophic consequences to the operation of a photomultiplier.

As far as screen 98 is concerned, it is required that it be a good electrical conductor and coated with a chemically inert material. Other illustrative examples, other than rhodium on copper, comprise aluminum coated with platinum, copper coated with platinum, and steel coated with gold.

In this manner, it is possible to obtain adequate insulation of the photomultiplier tube against ambient heat transfer and expanding air can lower the cathode temperature enough so that the gain of the tube can be increased by about tenfold. Also, by lowering the thermal dark current for the tube, it permits it to be operated at a higher per stage voltage without putting the tube operation into an ion instability region. By using the exhausted air from the photomultiplier enclosure to cool the incoming air, the overall efficiency of the system is improved.

While objects have been disclosed with relatively smooth walls or external surfaces, it is to be understood that the objects being tested may have indentations and/or embossments or the like, the configuration of which may tend to obscure the light path and make the detection of the hole more difficult. The source of light radiation is not critical in that the sensors are usable from x-rays through infrared.

While presently preferred embodiments of the invention have been illustrated and described, it will be recognized that the invention may be otherwise variously embodied and practiced within the scope of the claims which follow.

What I claim is:

1. A method of detecting minute holes in objects comprising the steps of
   a. placing an object between a source of light and a photoelectric cell means,
   b. establishing a light seal with the boundary of the object whereby the only light that can activate the photoelectric cell means comes from said source of light through one or more holes in said object,
   c. producing a periodic flexure of said object in the form of transient realignment of material surrounding a hole in said object,
   d. and directing light from said light source toward said object while said object is being flexed thereby activating said photoelectric cell means whenever a hole exists in said object.

2. A method of detecting minute holes in objects as defined in claim 1 wherein said step of producing a flexure of said object is accomplished by establishing a pressure differential on opposite sides of said object.

3. A method of detecting minute holes in objects as defined in claim 1 wherein said step of producing a flexure of said object is accomplished by establishing a standing wave on said object.

4. A method of detecting minute holes in objects as defined in claim 1 wherein said flexure is established electrically.

5. A method of detecting minute holes in objects as defined in claim 1 wherein said flexure is established magnetically.

6. A method of detecting minute holes in objects as defined in claim 1 wherein said flexure is established mechanically.

7. A method of detecting minute holes in objects as defined in claim 1 whereby said flexure is established acoustically.

8. A method of detecting minute holes in objects as defined in claim 1 including the additional step of enhancing the light path between said object and said photoelectric cell means by stimulating emission from phosphors positioned therebetween.

9. A method of detecting minute holes in objects as defined in claim 8, wherein said phosphors are located on reflector means which facilitate redirection of light which passes through said object toward said photoelectric cell means.

10. A method of detecting minute holes in objects as defined in claim 1 including the additional step of cooling said photoelectric cell means with compressed air taken from a readily available central plant source in order to lower the thermal noise of said photoelectric cell means.

11. A method of lowering the thermal noise of a photoelectric cell means comprising the steps of
   a. placing said photoelectric cell means in a thermally insulated recess,
   b. cooling the air surrounding said photoelectric cell means within said recess,
   c. and suppressing a corona discharge from electrodes within said photoelectric cell means.

12. A method of lowering the thermal noise of a photoelectric cell means as defined in claim 11 including the additional step of surrounding said photoelectric cell means with a metallic screen and maintaining said metallic screen at the cathode potential of said photoelectric cell means.

13. A method of lowering the thermal noise of a photoelectric cell means as defined in claim 12 wherein said metallic screen is copper and said screen is coated with rhodium.

14. An apparatus for detecting minute holes in objects which comprises
   a. support means for supporting an object to be tested,
   b. said support means being provided with an aperture adapted to be covered by an object to be tested,
   c. light seal means for engaging an object to be tested to establish a light seal therewith,
   d. photoelectric cell means positioned in proximity to said aperture to scan an object to be tested when said object is positioned over said aperture, e. means to withdraw said light seal means away from said aperture in order to position an object to be tested over said aperture, f. and wherein said support means is provided with a groove concentric with said aperture to permit internal expansion of said light seal means for reception of an object to be tested.

* * * * *